United States Patent
Trusler et al.

(10) Patent No.: US 8,144,848 B2
(45) Date of Patent: Mar. 27, 2012

(54) SYSTEM AND METHOD FOR TELEPHONE DIRECTORY ADVERTISING

(75) Inventors: Erik Trusler, St. Louis, MO (US); Bonnie Douglas, Valles Mines, MO (US); Frank Giannattasio, Chicago Heights, IL (US); Debra O'Brien, Ballwin, MO (US)

(73) Assignee: AT&T Intellectual Property I, LP, Reno, NV (US)

( * ) Notice: Subject to any disclaimer, the term of this patent is extended or adjusted under 35 U.S.C. 154(b) by 1308 days.

(21) Appl. No.: 11/769,578

(22) Filed: Jun. 27, 2007

(65) Prior Publication Data

US 2009/0003567 A1 Jan. 1, 2009

(51) Int. Cl.
*H04M 15/00* (2006.01)

(52) U.S. Cl. ............... 379/114.13; 705/14.54; 705/14.7; 379/114.05

(58) Field of Classification Search ............. 379/114.13, 379/114.05; 705/14, 26
See application file for complete search history.

(56) References Cited

U.S. PATENT DOCUMENTS

| | | | | |
|---|---|---|---|---|
| 5,359,642 A | * | 10/1994 | Castro | 379/121.01 |
| 5,930,474 A | | 7/1999 | Dunworth et al. | |
| 6,137,872 A | * | 10/2000 | Davitt et al. | 379/114.2 |
| 6,144,257 A | * | 11/2000 | Bouras et al. | 330/277 |
| 6,594,257 B1 | * | 7/2003 | Doshi et al. | 370/352 |
| 6,731,736 B2 | | 5/2004 | Meek et al. | |
| 7,050,990 B1 | | 5/2006 | Chu et al. | |
| 7,120,235 B2 | | 10/2006 | Altberg et al. | |
| 2005/0065811 A1 | | 3/2005 | Chu et al. | |
| 2005/0074102 A1 | * | 4/2005 | Altberg et al. | 379/114.1 |
| 2005/0119957 A1 | | 6/2005 | Faber et al. | |
| 2005/0203799 A1 | | 9/2005 | Faber et al. | |
| 2006/0129467 A1 | | 6/2006 | Chu et al. | |
| 2006/0182243 A1 | * | 8/2006 | Yun | 379/114.1 |
| 2007/0094073 A1 | * | 4/2007 | Dhawan et al. | 705/14 |
| 2007/0116217 A1 | | 5/2007 | Altberg et al. | |
| 2007/0233565 A1 | * | 10/2007 | Herzog et al. | 705/14 |

* cited by examiner

*Primary Examiner* — Creighton Smith
(74) *Attorney, Agent, or Firm* — Larson Newman, LLP

(57) ABSTRACT

A directory advertising system includes a user interface module, a database, and a control module. The user interface module displays a special telephone number for an advertiser in a directory advertisement. The database stores the directory advertisement, the special telephone number, and a maximum amount to be charged to the advertiser. The control module decrements the amount stored in the database when the special telephone number is dialed and deactivates the special telephone number when the amount reaches a predetermined level.

20 Claims, 3 Drawing Sheets

SYSTEM AND METHOD FOR TELEPHONE DIRECTORY ADVERTISING

FIELD OF THE DISCLOSURE

The present disclosure relates to directory advertising.

BACKGROUND

Printed telephone directory advertising, such as YellowPages, is well known. Such directories normally categorize businesses wishing to be listed, such that a potential consumer can easily peruse all of the businesses within a particular category. More recently, printed telephone directories have been supplemented by directories available on the Internet. In either case, conventional directory advertising systems normally charge businesses according to criteria such as the size, location, and duration of the advertisement displayed. Pricing the directory advertisement in this manner, however, is unrelated to the volume of calls that actually result from the advertisement.

DETAILED DESCRIPTION OF THE DRAWINGS

A directory advertising system charges an advertiser a fee only when a special telephone number from a directory advertisement is used to connect a caller to the advertiser. A directory displays one or more directory advertisements, each of which may have a special telephone number associated with the advertiser. The advertiser is charged a 'per call' rate each time the special telephone number is dialed. A maximum amount to be charged to the advertiser is set periodically, such as daily, weekly, monthly or yearly. Once the maximum amount is reached, the directory advertisement is no longer displayed and/or the special telephone number is deactivated.

Figure 1:
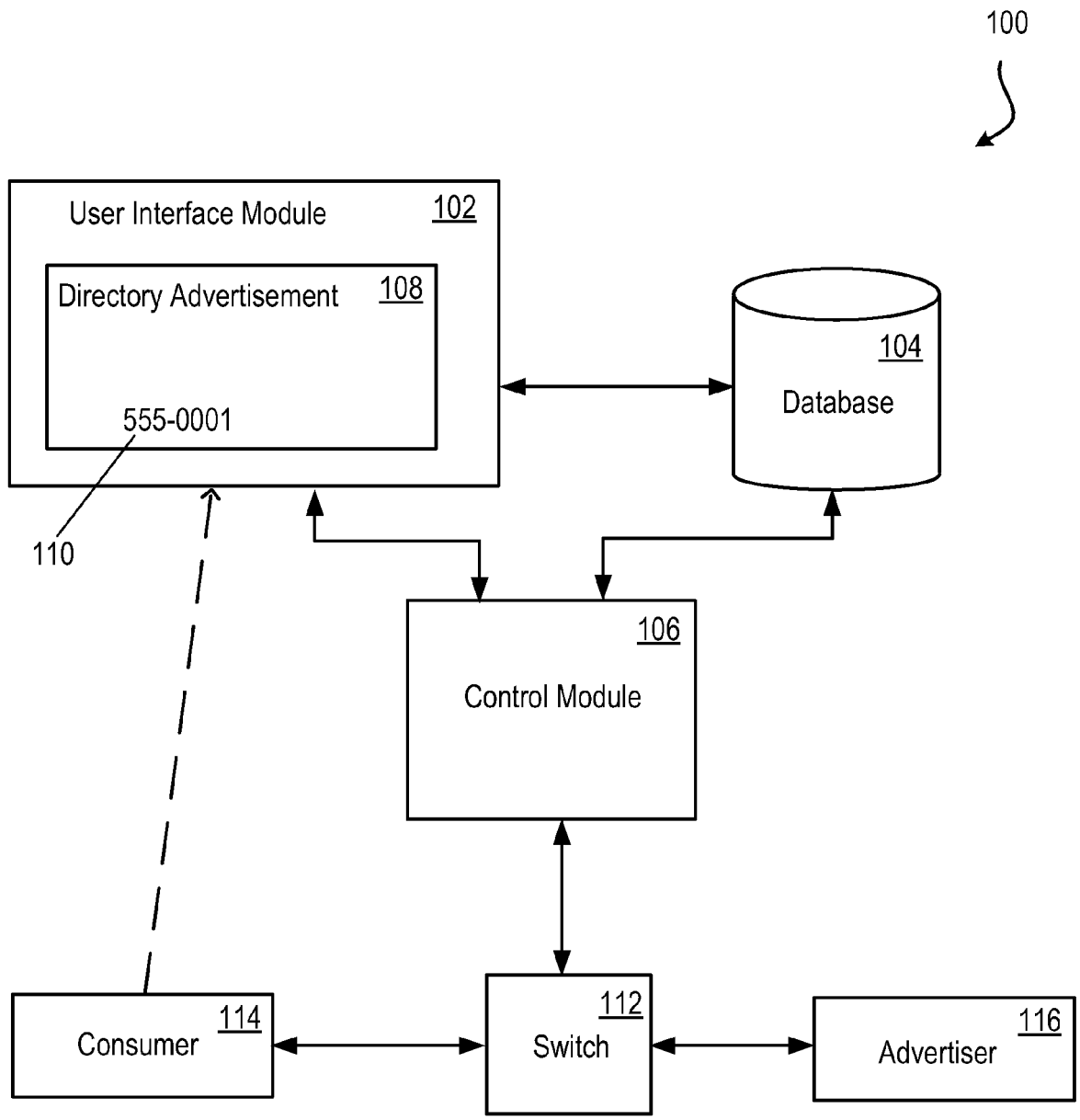
FIG. 1 is a block diagram of a directory advertising system.

FIG. 1 shows a block diagram of a directory advertising system 100 including a user interface module 102, a database 104, and a control module 106. The user interface module 102 displays one or more directory advertisements, such as a directory advertisement 108, along with one or more special telephone numbers, such as a special telephone number 110, associated with the directory advertisement. In a preferred embodiment, the user interface module 102 is an Internet browser, and the directory advertisement 108 is a web page displayed on the browser. The control module 106 communicates with the user interface module 102, the database 104, and a switch 112. Additionally, the user interface module 102 communicates with the database 104.

The database 104 stores directory advertisements for various products and/or services associated with different advertisers 116. A potential consumer 114 uses the interface module 102 to search for particular products or services. The user interface module 102 accesses the database 104 to display the directory advertisement 108 along with the special telephone number 110, preferably free of charge to the advertiser 116. If the consumer 114 is interested in an advertisement and dials the special telephone number 110, the telephone call enters the switch 112. The switch 112 in turn translates the special telephone number, and routes the call to terminate at the advertiser's place of business or other designated location.

The switch 112 thus connects the consumer 114 with the advertiser 116 because the consumer dialed the special telephone number 110 listed in the directory advertisement 108.

A maximum amount to be charged to the advertiser 116 is pre-set in the database 104, in the control module 106, in the switch 112, and/or elsewhere in the directory advertising system 100. The control module 106 monitors the special number telephone calls that are routed in the switch 112 and decrements the pre-set amount each time the special telephone number is dialed or, alternatively, completed. The 'per call' charge gives the advertiser 116 greater assurance that the directory advertisement 108 is effective.

The control module 106 records in the database 104 when the pre-set amount reaches a predetermined level, preferably but not necessarily to zero, and sets the user interface module 102 to no longer display the directory advertisement 108. Additionally or alternatively, the control module 106 deactivates the special telephone number 110. Once the special telephone number 110 is deactivated, the switch 112 no longer routes the special telephone number to the advertiser 116. The consumer 114 instead hears a message such as "the telephone number you dialed is not currently available, please try again later."

After the predetermined level is reached, the advertiser is informed that the user interface module 102 has stopped displaying the directory advertisement 108 and/or that the special telephone number 110 is deactivated. A print advertisement, of course, cannot be immediately removed. Once the advertiser 116 is informed that the maximum amount of money to be charged has been reached, the advertiser is given the option of replenishing the pre-set amount. The advertiser 116 has the further option to reactivate the service concurrently or at the beginning of a future time period such as the next day, the next week, the next month, or the next year. When the advertiser 116 replenishes the pre-set amount, that amount is stored as a new maximum amount in the database 104 and the control module 106 resets the user interface module 102 to display the directory advertisement 108 and reactivates the special telephone number 110, if necessary.

Figure 2:
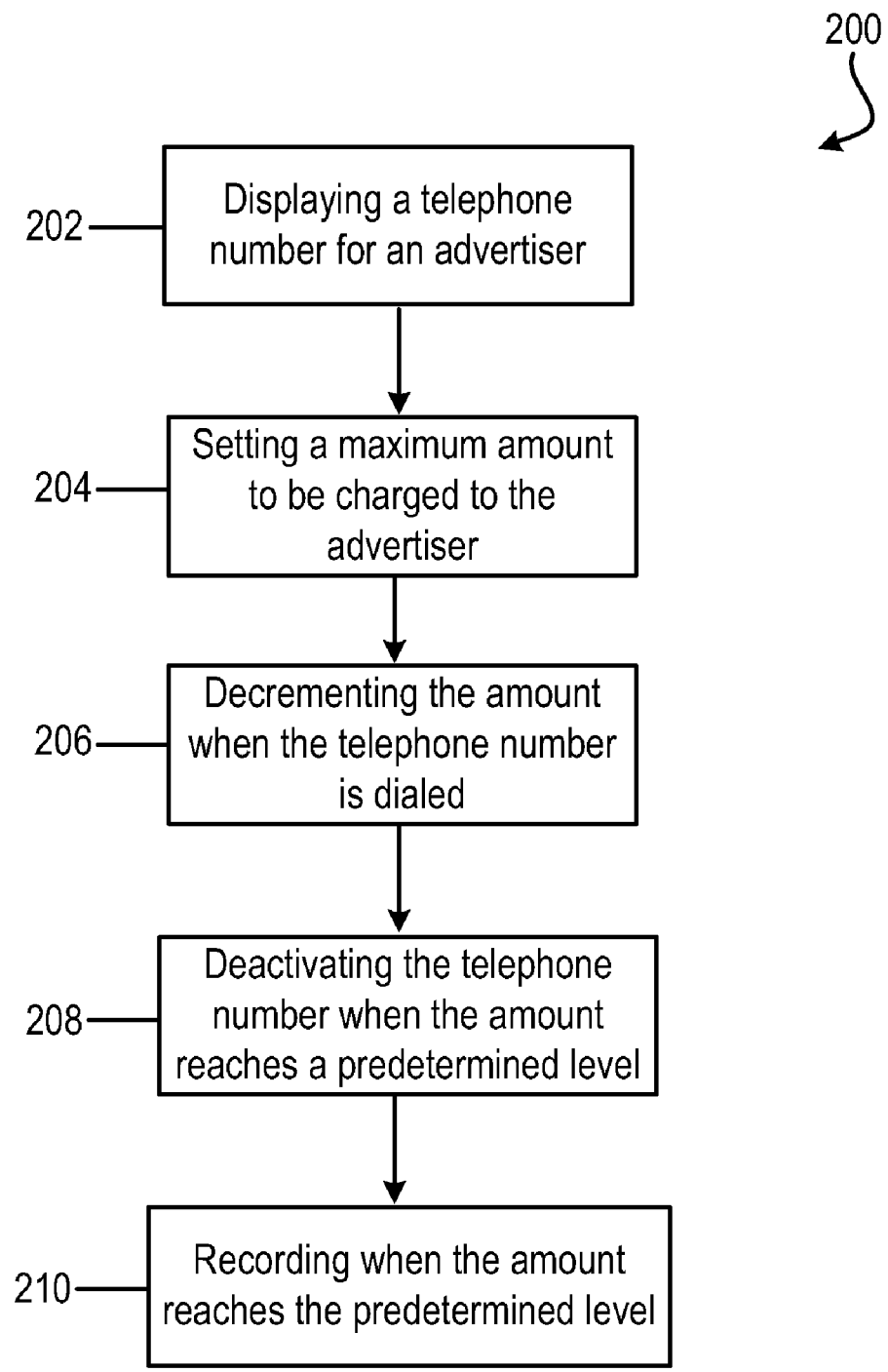
FIG. 2 is a flow chart of a method for displaying a directory advertisement.

FIG. 2 shows a method 200 for displaying a directory advertisement. At block 202, a directory advertising system displays a special telephone number. The special telephone number is displayed in either a printed telephone book directory or an Internet directory. The special telephone number is used to connect a consumer with an advertiser associated with the directory advertisement. At block 204, the directory advertising system sets a maximum amount to be charged to the advertiser. The amount is decremented each time the special telephone number is dialed at block 206. The 'per call' charge for connecting the consumer and the advertiser with the special telephone number is preferably the only charge associated with the directory advertisement. At block 208, the special telephone number may be deactivated when the amount reaches the predetermined level, such as zero. The directory advertising system records when the amount reaches the predetermined level at block 210. Additionally, the directory advertisement is no longer displayed when the amount reaches a predetermined level except, of course, in the case of print advertisements. The advertiser is given the option to replenish the amount to be charged to the advertiser after the amount reaches the predetermined level. If the advertiser replenishes the amount to be charged, the special telephone number is reactivated and the directory advertisement is displayed again.

Figure 3:
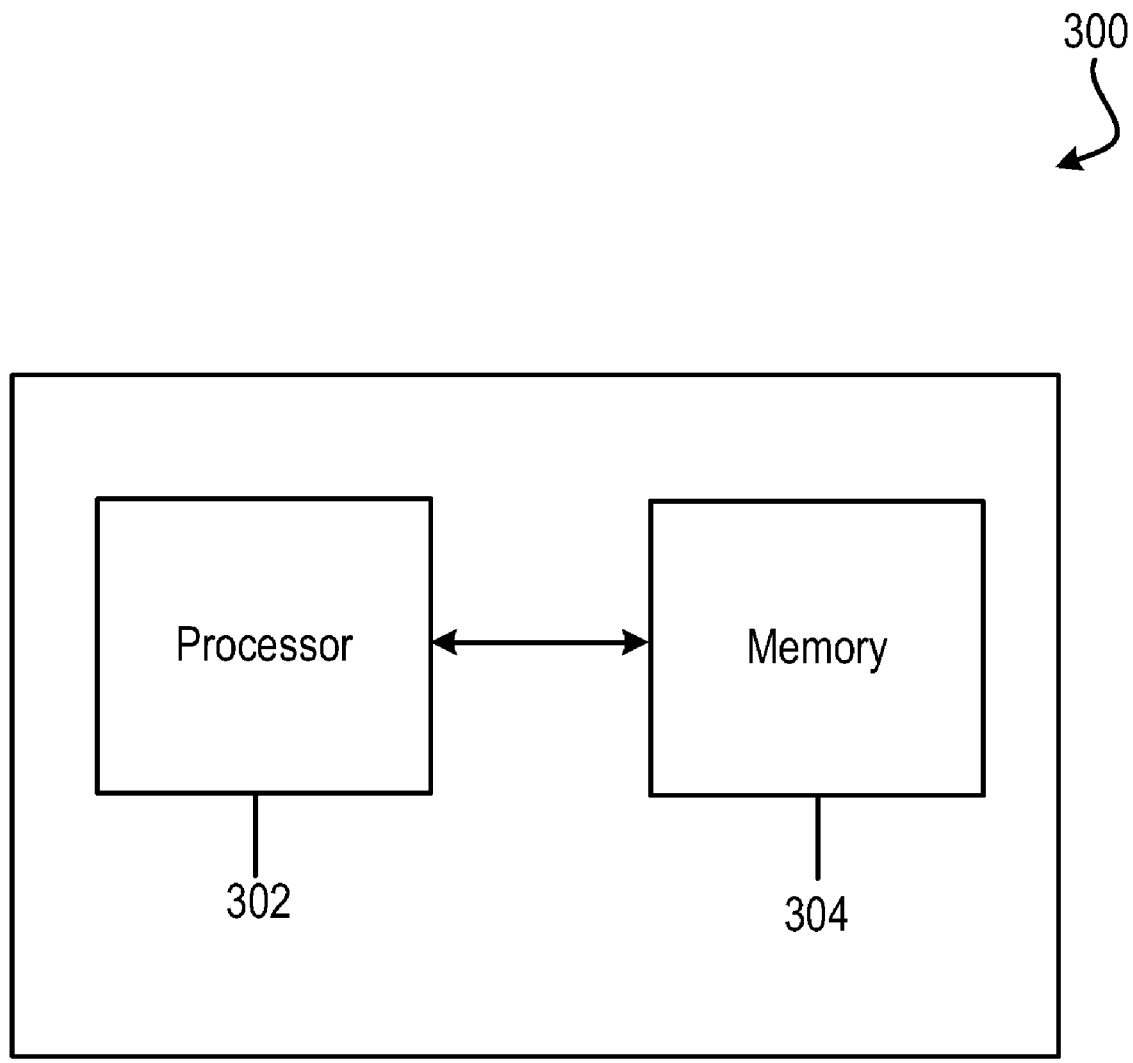
FIG. 3 is a block diagram of a data processing device.

FIG. 3 is a block diagram of a data processing device 300 comprising a processor 302 and a memory 304. The memory 304 may be a non-volatile read-only memory, a random access memory, or a solid-state memory. The memory 304 stores a set of instructions to manipulate the processor to perform the method 200 of FIG. 2. Alternatively, dedicated hardware implementations such as application specific integrated circuits, programmable logic arrays, and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs stored on a computer readable medium and executable by a computer system. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. Further, in an exemplary, non-limited embodiment, implementations can include distributed processing, component/object distributed processing, and parallel processing. Alternatively, virtual computer system processing can be constructed to implement one or more of the methods or functionality as described herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosed subject matter is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

What is claimed is:

1. A directory advertising system comprising:
a user interface module operably configured to display a special telephone number in a directory advertisement;
a database in communication with the user interface module, the database operably configured to store the directory advertisement, the special telephone number, and a maximum amount to be charged; and
a control module in communication with the user interface module and the database, the control module operably configured to decrement the amount stored in the database when the special telephone number is dialed and to deactivate the special telephone number when the amount reaches a predetermined level, wherein a user is provided with a message indicating that the special telephone number is not currently available when the special telephone number is dialed after the special telephone number has been deactivated.

2. The directory advertising system of claim 1 wherein the user interface no longer displays the directory advertisement when the amount reaches the predetermined level.

3. The directory advertising system of claim 1 wherein the predetermined level is zero.

4. The directory advertising system of claim 1 wherein the maximum amount may be replenished.

5. The directory advertising system of claim 4 wherein the special telephone number is reactivated and the directory advertisement is displayed when the maximum amount is replenished.

6. The directory advertising system of claim 1 wherein the user interface module is an internet page.

7. A method of advertising, comprising:
displaying a special telephone number for an advertiser;
setting a maximum amount to be charged to the advertiser;
decrementing the amount when the special telephone number is dialed; and
deactivating the special telephone number when the amount reaches a predetermined level, wherein a user is provided with a message indicating that the special telephone number is not currently available when the special telephone number is dialed after the special telephone number has been deactivated.

8. The method of claim 7 wherein a directory advertisement associated with the special telephone number is not displayed when the amount reaches the predetermined level.

9. The method of claim 7 wherein the predetermined level is zero.

10. The method of claim 7 wherein the maximum amount may be replenished.

11. The method of claim 10 wherein the special telephone number is reactivated when the maximum amount is replenished.

12. The method of claim 7 further comprising:
recording when the amount reaches the predetermined level.

13. The method of claim 7 wherein the special telephone number is displayed on an internet page.

14. A non-transitory computer readable medium comprising a plurality of instructions to manipulate a processor, the plurality of instructions comprising:
   instructions to display a special telephone number for an advertiser;
   instructions to set a maximum amount to be charged to the advertiser;
   instructions to decrement the amount when the special telephone number is dialed; and
   instructions to deactivate the special telephone number when the amount reaches a predetermined level, wherein a user is provided with a message indicating that the special telephone number is not currently available when the special telephone number is dialed after the special telephone number has been deactivated.

15. The non-transitory computer readable medium of claim 14 wherein a directory advertisement associated with the special telephone number is no longer displayed when the amount reaches the predetermined level.

16. The non-transitory computer readable medium of claim 15 wherein the predetermined level is zero.

17. The non-transitory computer readable medium of claim 15 wherein the special telephone number may be reactivated and the directory advertisement redisplayed when the maximum amount is replenished.

18. The non-transitory computer readable medium of claim 14 wherein the maximum amount may be changed.

19. The non-transitory computer readable medium of claim 14 wherein the special telephone number is displayed on an internet page.

20. The non-transitory computer readable medium of claim 14 wherein the maximum amount to be charged to the advertiser is set annually.

* * * * *